United States Patent
Trevino et al.

(10) Patent No.: US 6,378,894 B1
(45) Date of Patent: Apr. 30, 2002

(54) SEAMLESS PASSENGER SIDE INFLATABLE RESTRAINT SYSTEM

(75) Inventors: Lisandro Trevino, Ann Arbor; Ashir Prafull Thakore, Novi; Gerald Arthur Heath, Canton; Robert Floyd Kukla, Dearborn Hgts.; Shishir K. Agrawal, Belleville; Valerie DiCarlo, Ypsilanti, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/346,151

(22) Filed: Jul. 9, 1999

(51) Int. Cl.[7] ............................................. B60R 21/20
(52) U.S. Cl. ..................................... 280/728.3; 280/732
(58) Field of Search .............................. 280/728.3, 732, 280/730.1, 752

(56) References Cited

U.S. PATENT DOCUMENTS

| | | | | |
|---|---|---|---|---|
| 5,082,310 A | * | 1/1992 | Bauer ........................... 280/732 |
| 5,447,327 A | | 9/1995 | Jarboe et al. |
| 5,456,487 A | * | 10/1995 | Daris et al. ............... 280/728.3 |
| 5,458,365 A | | 10/1995 | Rogers et al. |
| 5,533,746 A | * | 7/1996 | Whited ........................ 280/731 |
| 5,549,324 A | * | 8/1996 | Labrie et al. ............. 280/728.3 |
| 5,556,126 A | | 9/1996 | Lee |
| 5,564,731 A | * | 10/1996 | Gallagher et al. ........... 280/732 |
| 5,584,502 A | * | 12/1996 | Phillion et al. .......... 280/728.3 |
| 5,590,901 A | * | 1/1997 | MacGregor ............... 280/728.3 |
| 5,590,903 A | * | 1/1997 | Phillion et al. ............. 280/732 |
| 5,681,051 A | * | 10/1997 | Phillion .................... 280/728.3 |
| 5,792,413 A | | 8/1998 | Ang et al. |
| 5,941,558 A | * | 8/1999 | Labrie et al. ............. 280/728.3 |
| 5,975,563 A | * | 11/1999 | Gallagher et al. ....... 280/728.3 |
| 6,045,153 A | * | 4/2000 | Sommer et al. ............ 280/732 |
| 6,109,645 A | * | 8/2000 | Totani et al. ............. 280/728.3 |
| 6,168,188 B1 | * | 1/2001 | Preisler et al. ........... 280/728.3 |
| 6,250,669 B1 | * | 7/2001 | Ohmiya ...................... 280/732 |
| 6,264,233 B1 | * | 8/2001 | DeWitt ..................... 280/728.3 |
| 6,318,752 B1 | * | 11/2001 | Warnecke et al. ....... 280/728.3 |

* cited by examiner

Primary Examiner—Kenneth R. Rice
Assistant Examiner—Lynda Jasmin
(74) Attorney, Agent, or Firm—Larry I. Shelton

(57) ABSTRACT

A seamless passenger side inflatable restraint system for a motor vehicle includes an instrument panel having a deployment opening and a deployment door integral with the instrument panel and closing the deployment opening. The seamless passenger side inflatable restraint system also includes a side inflatable restraint module disposed within the instrument panel and aligned with the deployment opening. The seamless passenger side inflatable restraint system further includes a door reinforcement connected to the deployment door and operatively connected to the instrument panel to rotate the deployment door and retain the deployment door to the instrument panel after inflation of an air bag of the side inflatable restraint module.

17 Claims, 5 Drawing Sheets

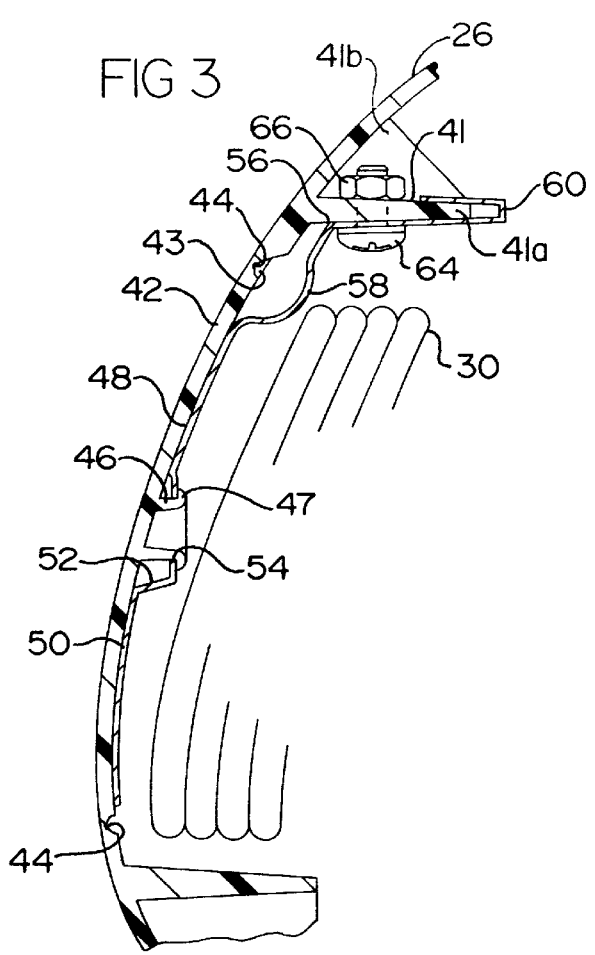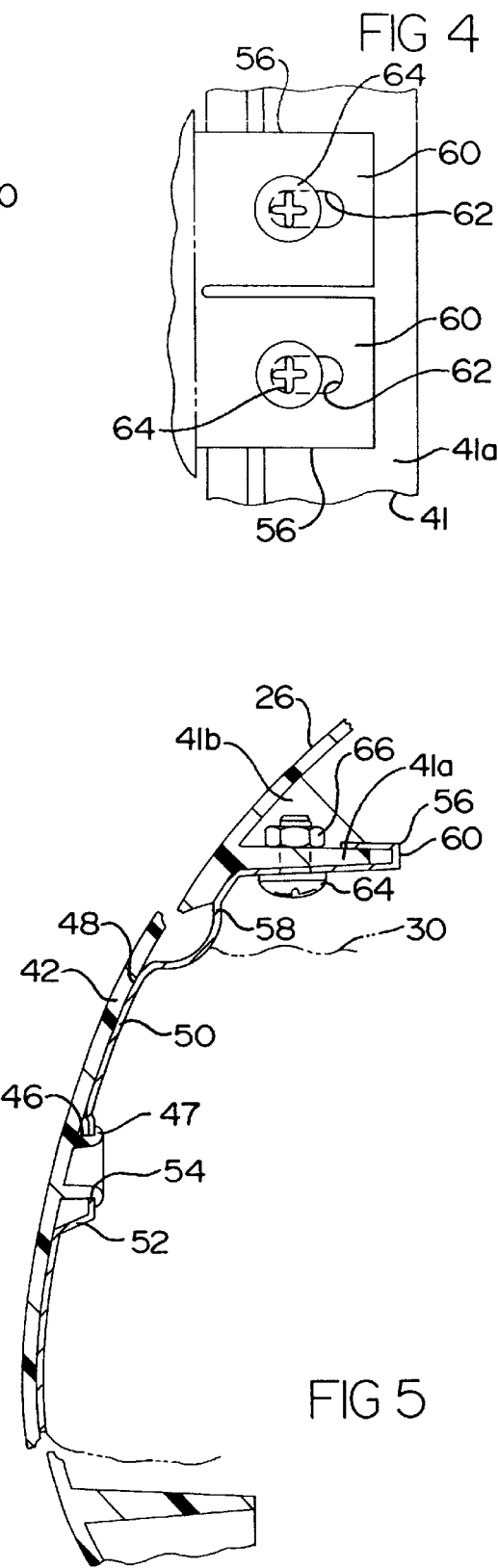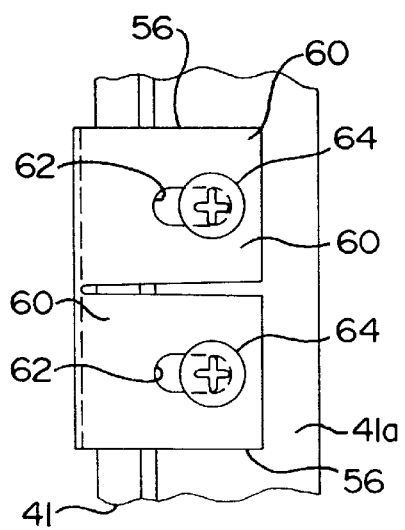

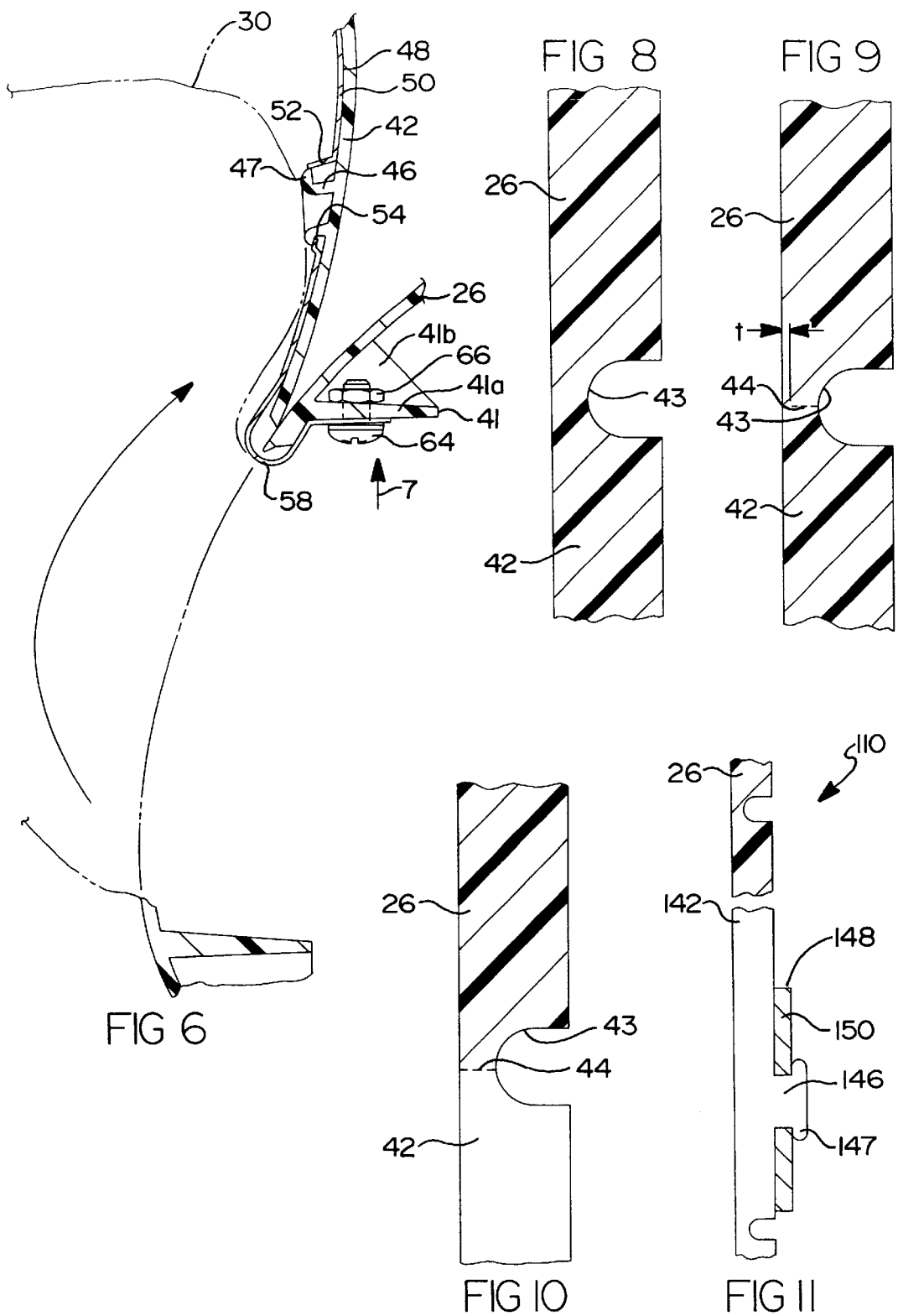

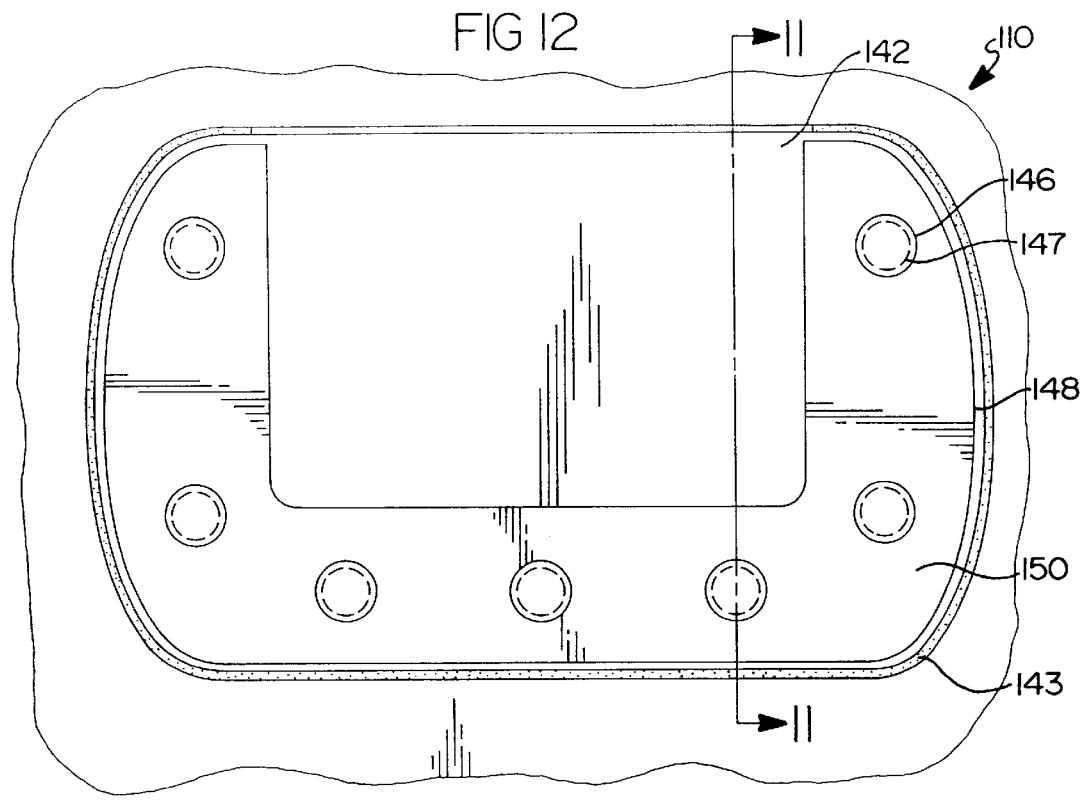
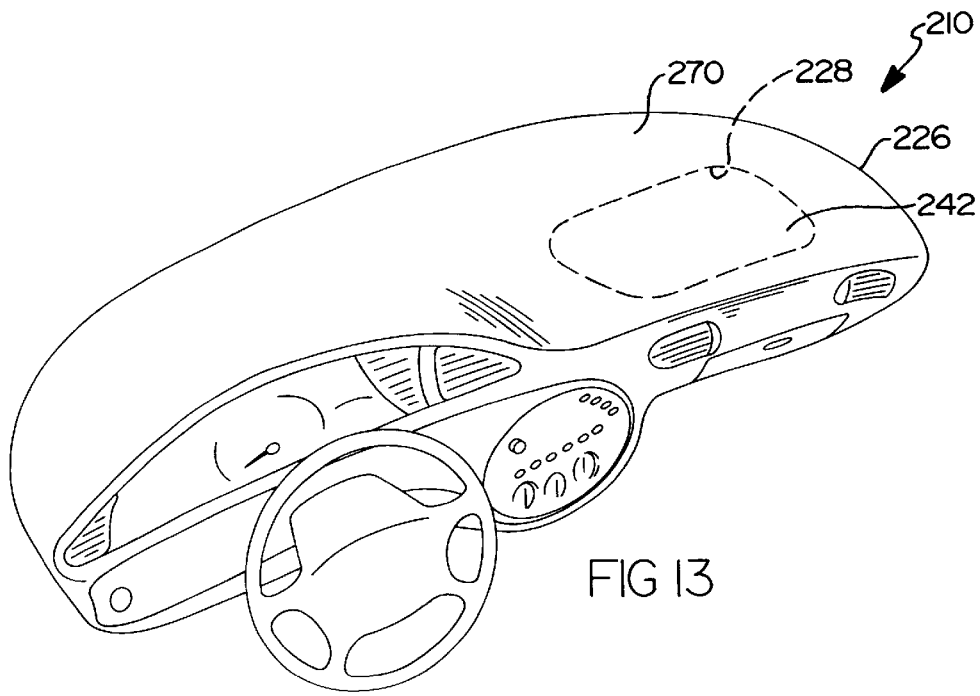

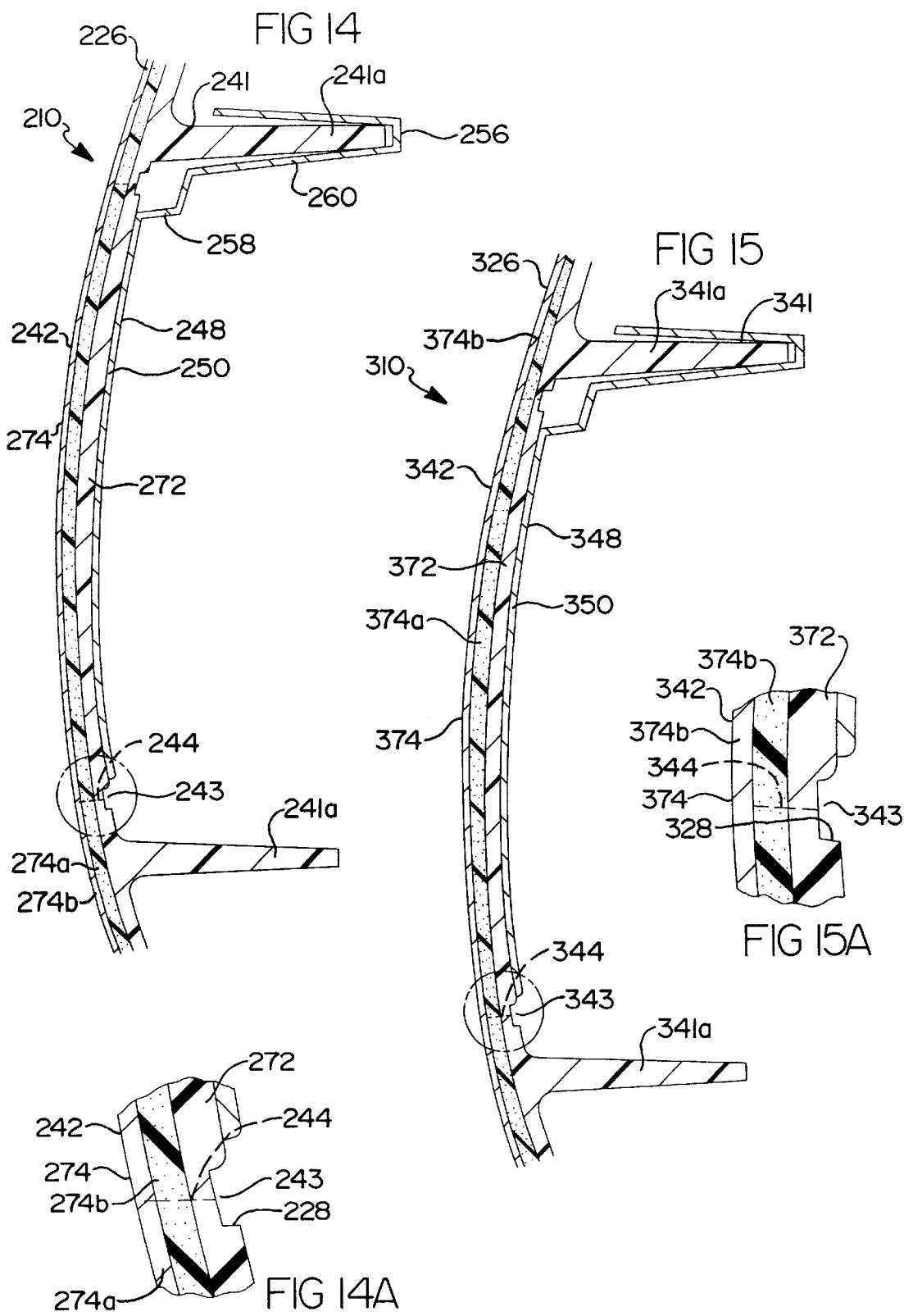

SEAMLESS PASSENGER SIDE INFLATABLE RESTRAINT SYSTEM

BACKGROUND OF THE INVENTION

1. Field of the Invention

The present invention relates generally to inflatable restraints and, more specifically, to a seamless passenger side inflatable restraint system for an instrument panel in a motor vehicle.

2. Description of the Related Art

A particular type of inflatable restraint for an occupant in a motor vehicle is commonly referred to as an air bag. The air bag is stored in the motor vehicle in an uninflated condition. When the motor vehicle experiences a collision-indicating condition of at least a predetermined threshold level, gas is directed to flow into the air bag from a gas producing source. The gas inflates the air bag to an extended condition in which the air bag extends into the occupant compartment of the motor vehicle. When the air bag is inflated into the occupant compartment, it restrains movement of the occupant to help protect the occupant from forcefully striking parts of the motor vehicle as a result of the collision.

For a passenger side air bag application, the air bag may be mounted in the instrument panel of the vehicle as a part of an air bag module. In addition to the air bag, the air bag module includes an inflator, a reaction canister and an air bag chute. The inflator is source of gas for inflating the air bag. The reaction canister acts as a reactionary member and the air bag chute guides the air bag away from the inflator. The instrument panel has a deployment opening through which the air bag emerges when it is being inflated.

Typically, a deployment door extends over the deployment opening to conceal the air bag and the other parts of the air bag module from the occupant compartment. The deployment door is typically part of the air bag module and disposed in the deployment opening of the instrument panel of the motor vehicle.

When the inflator is actuated, gas is directed from the inflator into the air bag. As the gas enters the air bag, it moves the air bag outward and forcefully against the deployment door. The force of the fluid pressure in the air bag ruptures a closure portion of the deployment door. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag is inflated outward from the air bag chute through the deployment opening and into the occupant compartment.

Although the above deployment door and air bag module has worked well when mounted in the instrument panel, there is a need in the art to provide an integrated deployment door, air bag chute and instrument panel as one-piece. Also, there is a need in the art to keep the deployment door from being separated from the instrument panel. Further, there is a need in the art to incorporate a seamless deployment door with an instrument panel.

SUMMARY OF THE INVENTION

Accordingly, the present invention is a seamless passenger side inflatable restraint system for a motor vehicle. The seamless passenger side inflatable restraint system includes an instrument panel having a deployment opening and a deployment door integral with the instrument panel and closing the deployment opening. The seamless passenger side inflatable restraint system also includes a side inflatable restraint module disposed within the instrument panel and aligned with the deployment opening. The seamless passenger side inflatable restraint system further includes a door reinforcement operatively connected to the deployment door and operatively connected to the instrument panel to rotate the deployment door and retain the deployment door to the instrument panel after inflation of an air bag of the side inflatable restraint module.

One feature of the present invention is that a seamless passenger side inflatable restraint system is provided for a motor vehicle. Another feature of the present invention is that the seamless passenger side inflatable restraint system integrates the deployment door, air bag chute and instrument panel into one piece. Yet another feature of the present invention is that the seamless passenger side inflatable restraint system has a door reinforcement as a metal insert with unique attachment features that provide the hinging mechanism needed for the deployment door and to keep the door from being separated from the instrument panel. Still another feature of the present invention is that the seamless passenger side inflatable restraint system has a seamless deployment door incorporated with the instrument panel manufactured by injection molding or laminate insert molding to provide cost and quality benefits of a seamless air bag system with the production efficiency of laminate insert molding.

Other features and advantages of the present invention will be readily appreciated as the same becomes better understood after reading the subsequent description when considered in connection with the accompanying drawings.

BRIEF DESCRIPTION OF THE DRAWINGS

FIG. 3 is a sectional view taken along line 3—3 of FIG. 2.

FIG. 4 is a bottom view of a portion of the seamless passenger side inflatable restraint system of FIG. 1 prior to deployment of an inflatable restraint of the seamless passenger side inflatable restraint system.

FIG. 5 is a side elevational view of the seamless passenger side inflatable restraint system of FIG. 1 illustrating initial deployment of the inflatable restraint.

FIG. 6 is a view similar to FIG. 5 illustrating full deployment of the inflatable restraint.

FIG. 7 is a bottom view of a portion of the seamless passenger side inflatable restraint system taken along line 7 of FIG. 6 after deployment of the inflatable restraint.

FIG. 8 is an enlarged fragmentary view of a portion of the seamless passenger side inflatable restraint system of FIG. 1.

FIG. 9 is a view similar to FIG. 8 illustrating partial scoring.

FIG. 10 is a view similar to FIG. 8 illustrating full scoring.

FIG. 11 is a sectional view taken along line 11—11 of FIG. 12.

FIG. 12 is a rear elevational view of another embodiment, according to the present invention, of the seamless passenger side inflatable restraint system of FIG. 1

FIG. 13 is a perspective view of yet another embodiment, according to the present invention, of the seamless passenger side inflatable restraint system of FIG. 1.

FIG. 14 is a fragmentary side elevational view of the seamless passenger side inflatable restraint system of FIG. 13.

FIG. 14A is an enlarged view of a portion in circle 14A of FIG. 14.

FIG. 15 is a view similar to FIG. 14 of still another embodiment, according to the present invention, of the seamless passenger side inflatable restraint system of FIG. 13.

FIG. 15A is an enlarged view of a portion in circle 15A of FIG. 15.

DESCRIPTION OF THE PREFERRED EMBODIMENT(S)

Figure 1:
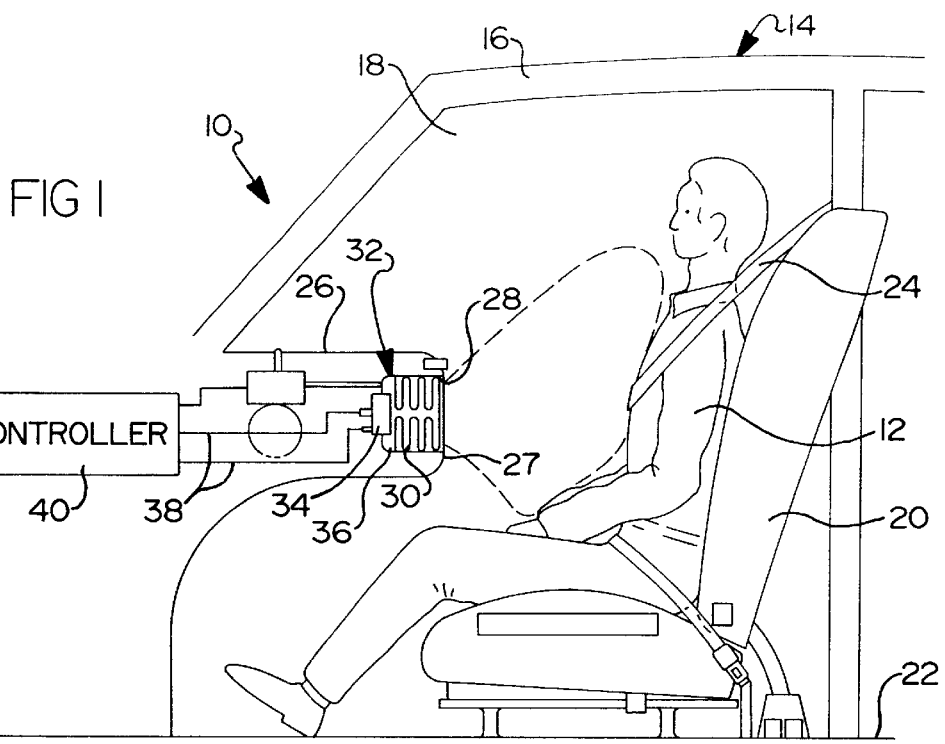
FIG. 1 is a side elevational view of a seamless passenger side inflatable restraint system, according to the present invention, illustrated in operational relationship with an occupant and a motor vehicle.

Referring to the drawings and in particular FIG. 1, one embodiment of a seamless passenger side inflatable restraint system 10, according to the present invention, is illustrated in operational relationship with an occupant 12 and a motor vehicle, generally indicated at 14. The motor vehicle 14 includes a vehicle body 16 forming an occupant compartment 18. The motor vehicle 14 also includes a seat 20 disposed in the occupant compartment 18 and attached to vehicle structure 22 such as a floor pan by suitable means. The motor vehicle 14 includes a restraint system 24 such as a belt to restrain the occupant 12 in the seat 20. The motor vehicle 14 includes an instrument panel 26 extending transversely across the occupant compartment 18 and spaced longitudinally forward of the seat 20. The instrument panel 26 has a rear surface 27 with a deployment opening 28 located opposite the seat 20 on a passenger side of the motor vehicle 14. It should be appreciated that, except for the seamless passenger side inflatable restraint system 10, the motor vehicle 14 is conventional and known in the art.

Figure 2:
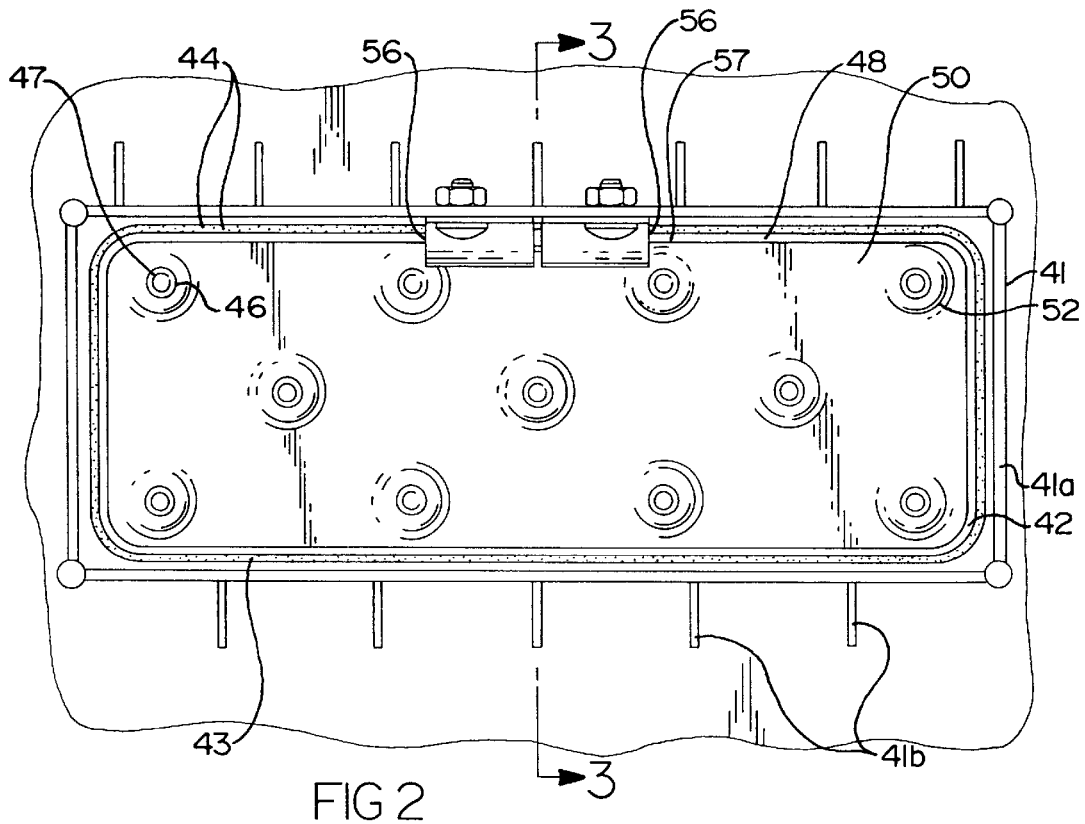
FIG. 2 is a rear elevational view of the seamless passenger side inflatable restraint system of FIG. 1.

Referring to FIGS. 1 through 3, the seamless passenger side inflatable restraint system 10 includes a side inflatable restraint 30 such as an air bag and a side inflatable restraint module, generally indicated at 32, for inflating the side inflatable restraint 30. The side inflatable restraint module 32 includes an inflator 34 operatively connected to the side inflatable restraint 30 and a reaction canister 36 partially disposed about the inflator 34 and side inflatable restraint 30. The inflator 34 is the source of inflation fluid or gas for inflating the side inflatable restraint 30 and is electrically connected by wires 38 to a controller 40. The controller 40 activates the inflator 34 upon receiving a signal from an inertia sensor (not shown) electrically connected thereto. The reaction canister 36 is generally C-shaped in cross-section and extends longitudinally and laterally to contain the inflator 34 and the side inflatable restraint 30. It should be appreciated that the side inflatable restraint 30 and side inflatable restraint module 32 are conventional and known in the art.

Referring to FIGS. 2 through 4, the seamless passenger side inflatable restraint system 10 includes an inflatable restraint chute 41 on a front surface of the instrument panel 26 about the deployment opening 28 to direct the side inflatable restraint 30 during deployment. The inflatable restraint chute 41 is a support rib 41a extending longitudinally and about the deployment opening 28 to form a generally rectangular chute. The inflatable restraint chute 41 may also have one or more support flanges 41b extending perpendicular to the support rib 41a on the front surface of the instrument panel 26. The support rib 41a and support flange 41b are molded just outside of the deployment opening 28 on the front surface of the instrument panel 26. It should be appreciated that the inflatable restraint chute 41 is integral, unitary and formed as one-piece with the instrument panel 26.

The seamless passenger side inflatable restraint system 10 includes a deployment door 42 to close the deployment opening 28 in the instrument panel 26. In this embodiment, the deployment door 42 is generally rectangular in shape. The deployment door 42 is a panel of a plastic material such as polypropylene or polycarbonate/ABS, preferably the same material as the instrument panel 26. The instrument panel 26 and deployment door 42 are made by a conventional injection molding process. The deployment door 42 is integral, unitary and formed as one-piece with the instrument panel 26. The deployment door 42 is formed by a groove or recess 43 in the instrument panel 26 to creating a thickness of the instrument panel 26 less than a remainder of the instrument panel 26 as illustrated in FIG. 8. The instrument panel 26 may be perforated or scored by a laser (not shown) in the groove 43 to form a plurality of perforations 44. The perforations 44 create a weakened and predictable tear seam during deployment that, when the side inflatable restraint 30 deploys the deployment door 42, the deployment door 42 will break on all four sides. As illustrated in FIG. 9, the perforations 44 may terminate at a depth to leave a predetermined thickness t such as 0.0625 inches. In another embodiment, as illustrated in FIG. 10, the perforations 44 may extend through the entire thickness. It should be appreciated that the groove 43 determines the shape of the deployment door 42 and outlines the inflatable restraint exit area to create a seamless deployment door 42 with the instrument panel 26.

Referring to FIGS. 2 through 6, the deployment door 42 includes at least one, preferably a plurality of studs 46 extending forwardly. The studs 46 are generally cylindrical in shape and hollow. The studs 46 extend axially and have a flange 47 extending radially from a free end thereof for a function to be described. The studs 46 are spaced about the deployment door 42 for a function to be described. It should be appreciated that the studs 46 are integral, unitary and formed as one-piece with the deployment door 42.

The seamless passenger side inflatable restraint system 10 includes a door reinforcement 48 attached to the deployment door 44. The door reinforcement 48 has a reinforcement sheet 50 that is a generally rectangular plate made of a metal material such as a soft aluminum. The door reinforcement 48 has at least one, preferably a plurality of recesses 52 extending forwardly from the reinforcement sheet 50. The recesses 52 are generally circular in shape and extend axially. The recesses 52 have an aperture 54 extending axially therethrough. The door reinforcement 48 is disposed adjacent the deployment door 42 such that the studs 46 extend through the apertures 54 in the recesses 52 of the reinforcement sheet 50 and the flange 47 on the studs 46 overlap the reinforcement sheet 50. It should be appreciated that the door reinforcement 48 is welded by suitable means such as heat staking to the deployment door 42 via the studs 46.

The door reinforcement 48 may include at least one, preferably a plurality of deformable hinges 56 extending from an upper edge 57 of the reinforcement sheet 50. The hinges 56 are laterally spaced and extend forwardly. Each hinge 56 has a kink portion 58 extending upwardly and a flange portion 60 extending forwardly from the kink portion 58. The kink portion 58 is generally arcuate in shape and provides extra material needed for the deployment door 42 to hinge. The kink portion 58 acts as a "living hinge" portion during deployment of the side inflatable restraint 30. The flange portion 60 has a general "C" shape that wraps around the support rib 41a over one side of the inflatable restraint chute 41. The flange portion 60 has a slot 62 extending longitudinally and therethrough to provide the extra room needed for the deployment door 42 to hinge. Each hinge 56 is integral, unitary and formed as one-piece with the reinforcement sheet 50. It should be appreciated that the flange portion 60 of the hinge 56 can be planar as illustrated in FIG. 6. It should also be appreciated that the door reinforcement 48 provides the door hinging mechanism during deployment and keeps the deployment door 42 attached to the instrument panel 26 during deployment.

The seamless passenger side inflatable restraint system 10 also includes at least one fastener 64 for removably fastening the door reinforcement 48 to the inflatable restraint chute 41. The fastener 64 is preferably a threaded bolt extending through the slot 62 in the flange portion 60 of the hinge 56 and an aperture (not shown) in the support rib 41a and secured thereto by a threaded nut 66. As illustrated in FIG. 4, before deployment of the side inflatable restraint 30, the hinge 56 is positioned so that the fastener 64 is at a door proximate position relative to the slot 62. As illustrated in FIG. 7, after deployment of the side inflatable restraint 30, the hinge 56 has deformed and relative movement between the hinge 56 and fastener 64 is permitted by the slot 62, so that the fastener 64 is at a chute proximate position relative to the slot 62. It should be appreciated that the fastener 64 does not move during deployment of the side inflatable restraint 30, but the hinge 56 bends and deforms around the fastener 64 with deformation being taken up by the slot 62.

In operation, when the motor vehicle 14 experiences a collision-indicating condition of at least a predetermined threshold level, the inflator 34 is activated by the controller 40 and the reaction canister 36 directs the gas to flow from the inflator 34 into the side inflatable restraint 30. As the gas enters the side inflatable restraint 30, it moves the side inflatable restraint 30 outward from the reaction canister 36. As the side inflatable restraint 30 deploys, the inflatable restraint chute 41 directs the side inflatable restraint 30 against the deployment door 42. The force of the side inflatable restraint 30 against the deployment door 42 causes the perforations 44 to tear on all four sides of the groove 43 and release the deployment door 42 from the instrument panel 26 as illustrated in FIG. 5. The side inflatable restraint 30 moves the deployment door 42 from the deployment opening 54. The deployment door 42 rotates upward via the hinges 56 and the door reinforcement 48 keeps the deployment door 42 tethered to the instrument panel 26 as illustrated in FIG. 6. The side inflatable restraint 24 is inflated outward from the deployment opening 28 to extend into the occupant compartment 18 of the motor vehicle 14 as illustrated by the phantom lines in FIG. 1. When the side inflatable restraint 30 is inflated into the occupant compartment 18, it restrains movement of the occupant 12 to help protect the occupant 12 from forcefully striking parts on the motor vehicle 14 as a result of the collision.

Referring to FIGS. 11 and 12, another embodiment 110, according to the present invention, is shown for the seamless passenger side inflatable restraint system 10. Like parts of the seamless passenger side inflatable restraint system 10 have like reference numerals increased by one hundred. The seamless passenger side inflatable restraint system 110 has a deployment door 142 outlined by the groove 143 similar to the deployment door 42. The deployment door 142 has studs 146 that are solid and not hollow. The studs 146 are disposed about the deployment door 142 in a generally "U" shaped configuration. The seamless passenger side inflatable restraint system 110 also has the door reinforcement 148 with the reinforcement sheet 150 as generally "U" shaped. The door reinforcement 148 is disposed adjacent the deployment door 142 such that the studs 146 extend through the apertures of the reinforcement sheet 150 and the flange 147 on the studs 146 overlap the reinforcement sheet 150. It should be appreciated that, in this embodiment, the door reinforcement 148 eliminates the hinges.

Referring to FIGS. 13 through 14A, another embodiment 210, according to the present invention, is shown for the seamless passenger side inflatable restraint system 10. Like parts of the seamless passenger side inflatable restraint system 10 have like reference numerals increased by two hundred (200). The seamless passenger side inflatable restraint system 210 has a deployment opening 228 in an upper or top surface 270 of the instrument panel 226. The seamless passenger side inflatable restraint system 210 has the deployment door 242 covering the deployment opening 228. The deployment door 242 includes a substrate 272 covered with a laminate 274 having a first layer 274a and a second layer 274b to form the deployment door 242 and instrument panel 226 using a laminate insert molding process which is conventional and known in the art. The groove 243 outlines the deployment door 242 and the deployment opening 228. The inflatable restraint chute 241 has the support rib 241a molded just outside of the deployment opening 228 to direct the side inflatable restraint 30 during deployment. The perforations 244 along the groove 243 are formed by a laser to a depth that penetrates the second layer 274b of the laminate 274 as illustrated in FIG. 14A to create a tear seam during deployment. The reinforcement sheet 250 is heat staked to the substrate 272 of the deployment door 242. The door reinforcement 248 has the hinge 256 extending from the reinforcement sheet 250 with the kink portion 258 and the flange portion 260 wrapped around the support rib 241a of the inflatable restraint chute 241. In this embodiment, the fasteners are eliminated and the hinge 256 acts to pivot the deployment door 242 during deployment of the side inflatable restraint 30 as will as a permanent attachment after deployment.

Referring to FIGS. 15 and 15A, another embodiment 310, according to the present invention, is shown for the seamless passenger side inflatable restraint system 210. Like parts of the seamless passenger side inflatable restraint system 210 have like reference numerals increased by one hundred (100). The seamless passenger side inflatable restraint system 310 has the deployment door 342 including the substrate 372 covered with the laminate 374. The laminate 374 has a first layer 374a and a second layer 374b. The deployment door 342 and instrument panel 326 are formed using a laminate insert molding process, which is conventional and known in the art. The groove 343 outlines the deployment door 342 and the deployment opening 328. The perforations 344 along the groove 343 are formed by a laser to a depth that penetrates only the first layer 374a of the laminate 374 as illustrated in FIG. 15A to create a tear seam during deployment. The door reinforcement 348 and inflatable restraint chute 341 are similar to that of FIGS. 14 and 14A.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seamless passenger side inflatable restraint system for a motor vehicle comprising:
    an instrument panel having a deployment opening;
    an inflatable restraint chute bounding said deployment opening and being integral with said instrument panel, said inflatable restraint chute having a support rib extending therefrom;
    a deployment door integral with said instrument panel and closing said deployment opening, said deployment door and said inflatable restraint chute being unitary and formed as one piece with said instrument panel;
    a side inflatable restraint disposed within said inflatable restraint chute of said instrument panel and aligned with said deployment opening; and
    a door reinforcement comprising a single reinforcement sheet disposed adjacent said deployment door and covering substantially an entire area of said deployment opening and operatively connected to said deployment door and having a flange portion with a general "C" shape wrapped around said support rib of said inflatable restraint chute of said instrument panel to rotate said deployment door and retain said deployment door to said instrument panel after inflation of said side inflatable restraint.

2. A seamless passenger side inflatable restraint system as set forth in claim 1 wherein said door reinforcement further comprises at least one hinge attached to said reinforcement sheet.

3. A seamless passenger side inflatable restraint system as set forth in claim 2 wherein said at least one hinge includes said flange portion.

4. A seamless passenger side inflatable restraint system as set forth in claim 3 wherein said flange portion includes at least one slot.

5. A seamless passenger side inflatable restraint system as set forth in claim 4 including at least one fastener extending through said slot in said flange portion to secure said at least one hinge to the instrument panel.

6. A seamless passenger side inflatable restraint system as set forth in claim 3 wherein said at least one hinge includes a kink portion between said flange portion and said reinforcement sheet.

7. A seamless passenger side inflatable restraint system as set forth in claim 1 wherein said deployment door has at least one stud extending outwardly.

8. A seamless passenger side inflatable restraint system as set forth in claim 7 wherein said door reinforcement has at least one aperture extending therethrough, said at least one stud extending through said at least one aperture.

9. A seamless passenger side inflatable restraint system as set forth in claim 1 wherein said door reinforcement comprises a metal material and said deployment door comprises a plastic material.

10. A seamless passenger side inflatable restraint system as set forth in claim 1 wherein said instrument panel and said deployment door comprises a substrate and a laminate molded to said substrate.

11. A seamless passenger side inflatable restraint system as set forth in claim 10 including a plurality of scored perforations extending through said substrate and into said laminate panel so as to permit outward deployment of said deployment door when said inflatable restraint is inflated.

12. A seamless passenger side inflatable restraint system as set forth in claim 1 including a groove extending into said instrument panel to define said deployment door.

13. A seamless passenger side inflatable restraint system as set forth in claim 12 including a plurality of scored perforations extending through said groove into said instrument panel so as to permit outward deployment of said deployment door when said inflatable restraint is inflated.

14. A seamless passenger side inflatable restraint system for a motor vehicle comprising:
    an instrument panel having a deployment opening;
    an inflatable restraint chute bounding said deployment opening and being integral with said instrument panel, said inflatable restraint chute having a support rib extending therefrom;
    a side inflatable restraint module disposed within and attached to said instrument panel and having an inflatable restraint disposed within said inflatable restraint chute;
    a deployment door closing said deployment opening and integral with said instrument panel, said deployment door and said inflatable restraint chute being unitary and formed as one piece with said instrument panel; and
    a metal door reinforcement comprising a single reinforcement sheet disposed adjacent said deployment door and covering substantially an entire area of said deployment opening and connected to said deployment door and having a flange portion with a general "C" shape wrapped around said support rib of said inflatable restraint chute of said instrument panel to rotate said deployment door and retain said deployment door to said instrument panel after inflation of said inflatable restraint.

15. A seamless passenger side inflatable restraint system as set forth in claim 14 wherein said at least one hinge includes said flange portion having a slot therein, and at least one fastener extending through said slot in said flange portion to secure said at least one hinge to the instrument panel.

16. A seamless passenger side inflatable restraint system as set forth in claim 15 wherein said deployment door has at least one stud extending outwardly and said reinforcement sheet has at least one aperture extending therethrough, said at least one stud extending through said at least one aperture and being heat staked thereto.

17. A seamless passenger side inflatable restraint system for a motor vehicle comprising:
    an instrument panel having a deployment opening and an inflatable restraint chute integral with said instrument panel and bounding said deployment opening, said inflatable restraint chute having a support rib extending therefrom;
    a side inflatable restraint module disposed within said instrument panel opposite said deployment opening and having an inflatable restraint disposed within said inflatable restraint chute;
    a deployment door closing said deployment opening and being integral with said instrument panel, said deployment door and said inflatable restraint chute being unitary and formed as one piece with said instrument panel; and
    a metal door reinforcement having a single reinforcement sheet disposed adjacent said deployment door and covering substantially an entire area of said deployment opening and connected to said deployment door and at least one hinge having a flange portion with a general "C" shape wrapped around said support rib of said inflatable restraint chute to rotate said deployment door and retain said deployment door to said instrument panel after inflation of said inflatable restraint.

* * * * *